Dec. 2, 1924.

W. R. TWIFORD

WINDMOTOR

Filed Oct. 4, 1923

WITNESSES
H. J. Walker

INVENTOR
WILLIAM R. TWIFORD
BY Munn & Co
ATTORNEYS

Dec. 2, 1924.
W. R. TWIFORD
WINDMOTOR
Filed Oct. 4, 1923
1,518,022
3 Sheets-Sheet 2
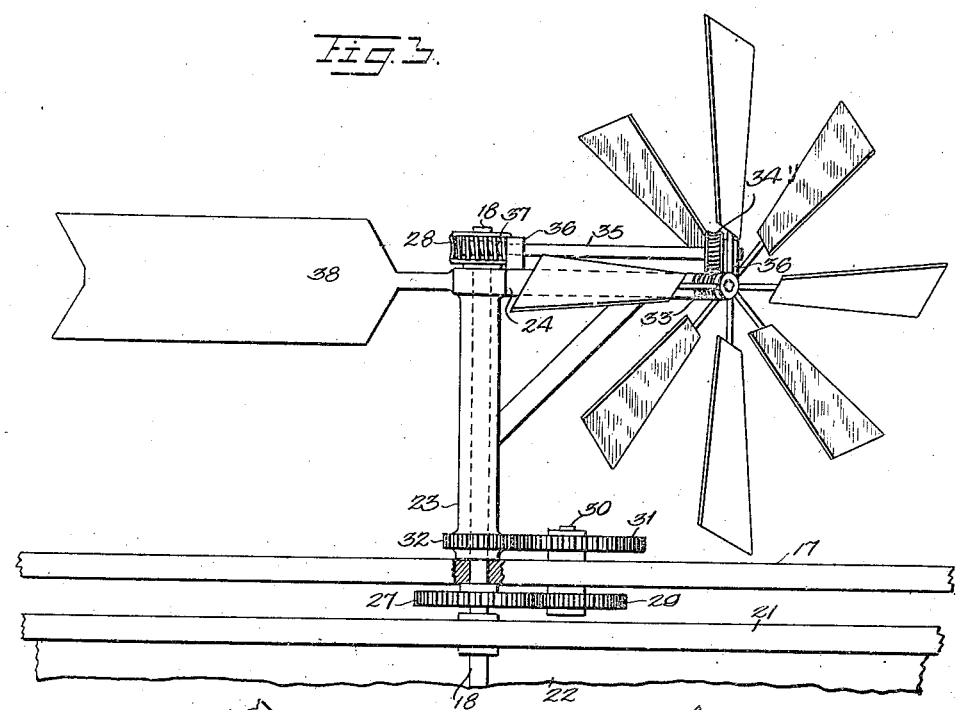
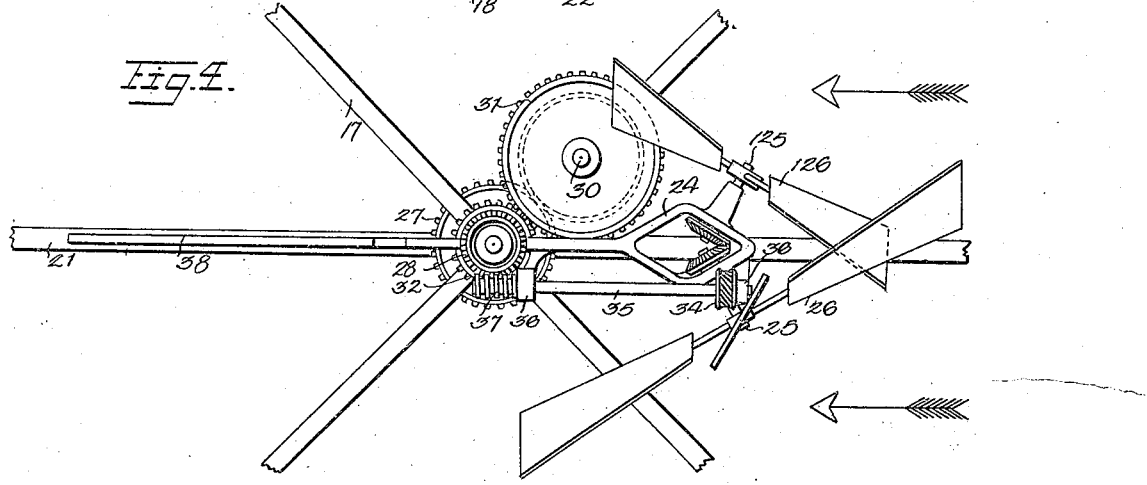
WITNESSES
INVENTOR
WILLIAM R. TWIFORD
BY
ATTORNEYS Dec. 2, 1924. 1,518,022
W. R. TWIFORD
WINDMOTOR
Filed Oct. 4, 1923 3 Sheets-Sheet 3

WITNESSES
H. J. Walker
J. McAuliffe

INVENTOR
WILLIAM R. TWIFORD
BY
ATTORNEYS

Patented Dec. 2, 1924.

1,518,022

UNITED STATES PATENT OFFICE.

WILLIAM R. TWIFORD, OF INDIANAPOLIS, INDIANA.

WINDMOTOR.

Application filed October 4, 1923. Serial No. 666,604.

*To all whom it may concern:*

Be it known that I, WILLIAM R. TWIFORD, a citizen of the United States of America, and a resident of Indianapolis, in the county of Marion and State of Indiana, have invented a new and Improved Windmotor, of which the following is a description.

My invention relates to wind mills or wind motors and more particularly to a wind motor which is in general of the merry-go-round type and in which a series of sail-driven trucks travel over a continuous track and serve to jointly drive a cable having driving engagement with a power wheel the power developed by the turning of which wheel may be readily applied for doing useful work.

The general object of the invention is to provide an efficient wind motor of the class referred to and controlling means therefor, whereby the sails mounted on the respective trucks will automatically feather as the trucks run about the track that the sails may receive the wind pressure in a manner to effectively drive the trucks, the control means being governed by a wind wheel appurtenant to each truck.

A more specific object of the invention is to provide an embodiment of the invention reflecting practical considerations with respect to strength, simplicity of assemblage and adjustment and characterized by unfailing efficiency in maintaining the governing wind wheels constantly in a plane to present all the wheels to the wind while functioning to cause feathering of the sails.

The manner and means whereby the above and other objects are attained will clearly appear as the description proceeds.

Reference is to be had to the accompanying drawings forming a part of this specification, it being understood that the drawings are merely illustrative of one example of the invention.

Figure 3 is an enlarged side elevation of the gearing assemblage coordinating the wind wheels of a motor unit with the shaft of the sail of said unit;

Figure 4 is a plan view of the assemblage shown in Figure 3;

Figure 1:
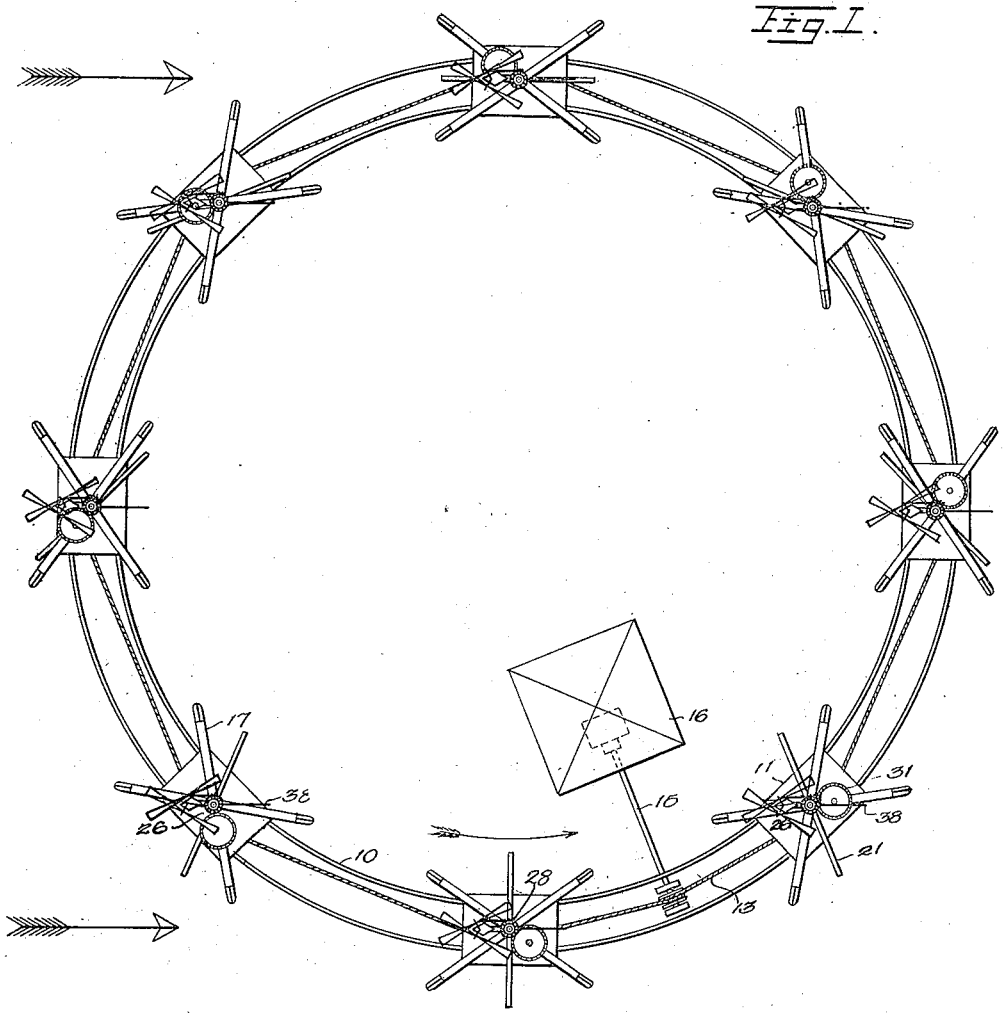
Figure 1 is a plan view of a wind motor embodying my invention.
Figure 2:
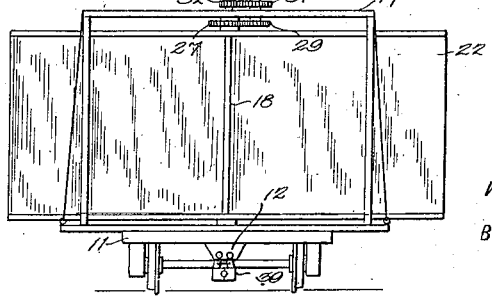
Figure 2 is a front elevation of one of the motor units.
Figure 5:
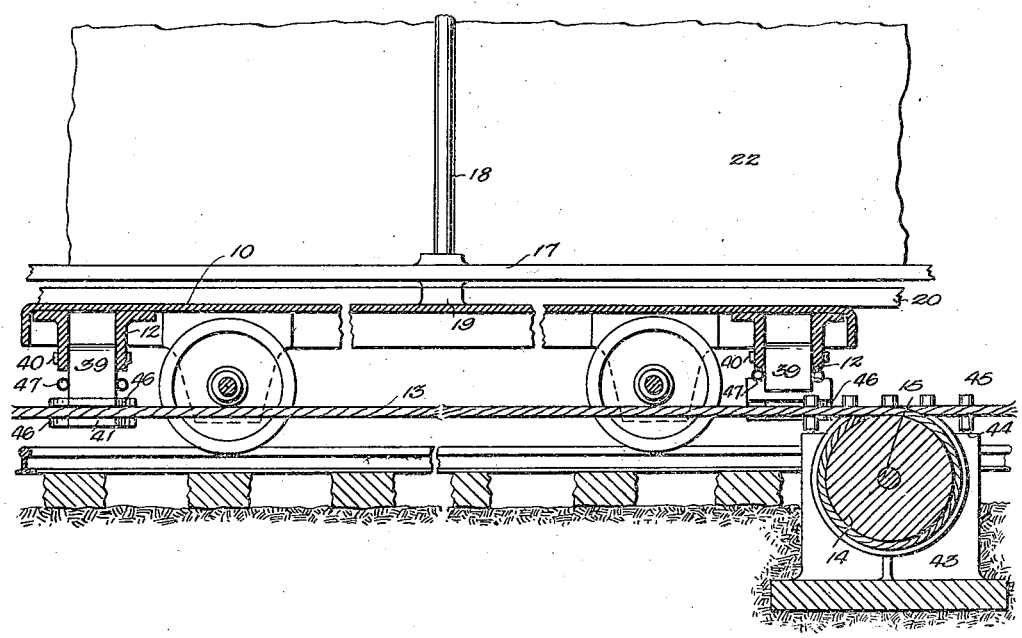
Figure 5 is a longitudinal vertical sectional view taken through a truck and the power wheel of the motor including the power cable, the view showing in elevation a fragment of the sail and its shaft.
Figures 6, 7:
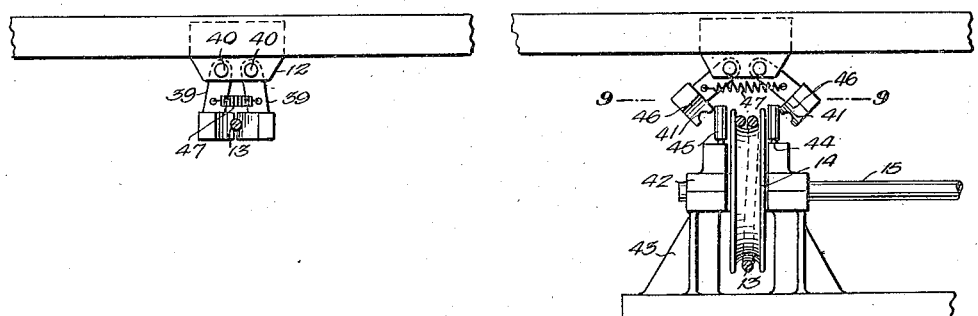
Figure 6 is an end view of the grip provided on each power unit for engaging the cable, the grip jaws being shown closed upon the cable.
Figure 7 is an end view showing the grip with its jaws in open position as well as the power wheel of the motor and the means for causing the gripping jaws to open and close on said wheel.
Figure 8:
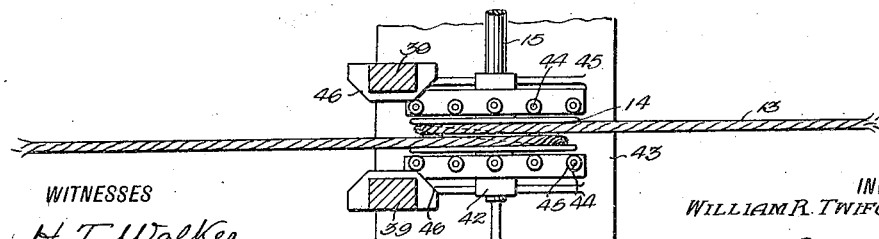
Figure 8 is a horizontal section on the line 9—9, Figure 8.

In carrying out my invention in accordance with the illustrated example, I provide a track 10 over which travel a series of trucks 11, eight of which are employed in the illustrated example. The trucks are wind driven as will appear and each truck is equipped with a gripping device designated generally by the numeral 12 adapted to grip a power cable 13 for driving the latter by the travel of the trucks. The cable 13 is given a turn about a power wheel 14 from the shaft 15 of which power may be taken off by any approved means, the numeral 16 indicating conventionally a power house within the track 10. On each truck 11 is a suitable frame 17 and a vertical shaft 18 has a bearing at its lower end as at 19 in the truck platform 20, said shaft extending through the top and bottom of the frame 17. Fixed to the shaft 18 is a frame 21 of the sail 22 so that the sail and shaft turn in unison.

On the shaft 18 above the frame 17 is a sleeve 23 having a rigid lateral arm 24 in which turn the shafts 25 and 125 controlling wind wheels 26 and 126. A gear train establishes connection between the shaft 18 and the sleeve 23 as follows: On the shaft 18 below the top of frame 17 is keyed a pinion 27 and on the upper end of said shaft 18 is a worm wheel 28. Thus the shaft 18, sail frame 21, frame 22, pinion 27 and worm wheel 28 turn in unison being in fixed relation to one another.

The pinion 27 meshes with a pinion 29 on a short vertical shaft 30 keyed to which also is a pinion 31 meshing with a smaller pinion 32 rigid with the sleeve 23. It will be observed that the pinion 32, sleeve 23, arm 24 and wheels 26, 126 will be constrained to turn as a unit about the shaft 18 as an axis. The ratios of the pinions 32, 31 are as one to two while the pinions 27, 29 are of equal size. On the shaft 25 of the controlling wind wheel 26 is a worm 33 meshing with which is a worm wheel 34 on a shaft 35, said shaft 35 turning in bearings 36 on the arm 24.

The shaft 125 of wind wheel 126 is at an angle to the shaft 25 of wheel 26 so that the wind wheels 26 and 126 will revolve in planes at an angle to each other so that one or both will effectively take the wind. Besides the worm 33 on shaft 25 of wheel 26 said shaft has a bevel pinion 133 meshing with a bevel pinion 233 on shaft 125 of wheel 126 so that the two wind wheels 26 and 126 are thus geared together and constitute a unit.

Shaft 35 carries a worm 37 meshing with the worm wheel 28 on shaft 18.

It will be observed from Figure 1 that the several sail frames 21 and therefore the sails carried by the frames are disposed in different angular positions. The arrows shown at the outside of the track 10 at the left indicate the direction of the wind while the curved arrow indicates the direction of travel of the trucks 11 and cable 13. It will be observed from Figure 1 also that all the controlling wind wheels 26 and 126 of each unit take the wind irrespective of the varying angular positions of the sails. The wind pressure against the preponderating sail surface at one side of the center of the track 10 causes the trucks 11 to travel contra-clockwise, at the same time the controlling wind wheels 26 and 126 are turning about their own axes. The turning of a wind wheel unit (26 and 126) will through the worm 33 and worm wheel 34 and the pinions 133 and 233 drive the shaft 35 and worm 37 and said worm 37 by reason of meshing with the worm wheel 28 will turn said worm wheel 28 and the shaft 18 as well as the pinion 27 and will turn the sail frame 21 to various angular positions in the frame 17. At the same time while the frame 21 and sail 22 are turning with the shaft 18 about the axis of said shaft, the pinion 27 will turn the pinion 29, shaft 30 and pinion 31, thereby imparting a turning movement to the pinion 32 and thereby swinging the arm 24 and controlling wind wheels 26, 126 laterally through an arc, thus swinging said arm 24 and wind wheels 26 and 126 relatively to the sail 22, the ratio of movement being such that all the wind wheels will constantly maintain their positions in the wind while the several sails 21 will feather as they travel over the track 10.

Each controlling wind wheel unit composed of wheels 26 and 126 has a vane 38 the plane of which is medial to the planes of said wind wheels 26 and 126, said vane causing the unit to respond to a shift of the wind. There will be a corresponding movement of the parts in the power unit since as the wind wheel unit is swung through an arc the arm 24 will move accordingly and turn the sleeve 23 which through the train of gears 32, 31, 29 and 27 will impart a corresponding turning movement to the shaft 18, sail 22 and worm wheel 28 so that the parts maintain their relative positions with a shift of the wind.

Reverting to the grips 12, each grip includes jaws 39 the shanks of which are pivoted as at 40 so that the jaws swing toward and from each other. The opposed faces of the jaws are grooved as at 41 to embrace the cable 13. The shaft 15 of power wheel 14 is journaled in bearings 42 on any suitable structure 43. On the structure 43 at each side of the power wheel 14 is a series of vertical pins 44 having rollers 45 sleeved thereon. The ends 46 of the jaws 39 are bevelled and in the travel of a truck 11 toward the power wheel 14 as the bevelled ends of the jaws engage the rollers, 45, the jaws will be caused to separate, thereby loosening the grip on the cable, the two series of rollers at the opposite sides of the power wheel guiding the open jaws 39 past said wheel. Upon the jaws 39 passing the rollers 45 the jaws will be moved toward each other and grip the cable by the action of a spring 47 connecting the jaws.

It will be apparent that the plurality of units represented by the trucks 11 and the described assemblages carried thereby are coordinated through the medium of the cable 13 to travel in an endless path, here shown as determined by the circular track. Thus, the described coordination of the several travelling units with one another and with the power shaft through the medium of the cable effects the proper feathering of the sails by varying their respective angular positions while the several controlling wheels are all similarly disposed to be presented to the wind and all responsive to a shift in the wind without disturbing the relation of a given controlling wheel to the sail controlled thereby. Thus, the described organism constitutes in effect a wind wheel, without employing a common hub or radial arms mounting the sails as in the ordinary wind wheel.

I would state in conclusion that while the illustrated example constitutes a practical embodiment of my invention, I do not limit myself strictly to the exact details herein illustrated, since, manifestly, the same can be considerably varied without departure from the spirit of the invention as defined in the appended claims.

Having thus described my invention, I claim:

1. In a wind motor of the class described, a series of sails, individual means separately mounting said sails and adapted to travel in an endless path, a controlling wind wheel mounted to travel with each sail, and means acted upon by each controlling wheel and connected with the individual sails to cause feathering of the sails in traveling about said path.

2. In a wind motor of the class described, a series of sails, means mounting the individual sails and adapted to travel in an endless path, said sails each mounted to have movement about a vertical axis for feathering, a controlling wind wheel unit for each sail, each wind wheel unit mounted to travel with said means and adapted to have a swinging movement, with a shift of the wind, about the vertical axis of the sail, and means actuated by the turning of the wind wheels about their own axes and adapted to turn the sail for feathering the latter as the sail traverses the said path, said last-mentioned means adapted also with the swinging of the wind wheel unit about the axis of the sail to cause the sail to conform to the shifting position of the controlling wheel.

3. In a wind motor, a series of separate and independent wind-propelled units mounted to travel about a common axis and a power cable with which all the units are adapted to have driving engagement so that the power developed by the several units is cumulatively applied to the cable.

4. In a wind motor of the class described, a power shaft, a cable having driving engagement with said shaft, and a series of wind-propelled units adapted to have driving engagement with said cable so that the power developed by several units is cumulatively applied to the cable.

5. In a wind motor of the class described, a series of separate and independent wind-propelled units mounted to travel about a common axis and a power cable with which all the units are adapted to have driving engagement so that the power developed by the several units is cumulatively applied to the cable, each of said units having a sail; together with an individual controlling wind wheel for each unit, and means to maintain the wind wheels in the wind as they travel about said axis.

6. In a wind motor of the class described, a series of separate and independent wind-propelled units mounted to travel about a common axis and a power cable with which all the units are adapted to have driving engagement so that the power developed by the several units is cumulatively applied to the cable, each of said units having a sail; together with an individual controlling wind wheel assemblage for each of said units, said controlling wheel assemblages adapted to maintain the wind wheels thereof in the wind as they travel about said axis, and means to feather the sails of the respective units as said units travel about said axis.

7. In a wind motor of the class described, a series of independent wind-propelled units, a power cable, and gripping means carried by the individual units and adapted to have driving engagement with said cable.

8. In a wind motor of the class described, a power shaft, a power wheel on said shaft, a cable having a turn about said power wheel, and a series of separate wind-propelled units each including means to effect driving engagement with said cable.

9. In a wind motor of the class described, a power wheel, a cable having a turn about said power wheel, a series of wind-propelled units, a cable grip on each unit, said grip comprising jaws adapted to open and close to engage and release the cable, and means in the path of movement of said grips and adjacent the power wheel to cause the jaws of the grips to open in succession as they approach said power wheel and to close upon the successive units passing the power wheel.

10. In a wind motor, a series of separate and independent wind-propelled units mounted to travel about a common axis and a power cable with which all the units are adapted to have driving engagement so that the power developed by the several units is cumulatively applied to the cable, said units each having a sail, a controlling wind wheel assemblage on each unit adapted to cause feathering of the sails, as the units turn about said axis, each of said assemblages swingable through an arc in response to a shift in the wind, and means to cause the wind wheels and sails to maintain their relative positions during said swinging movement of the wind wheels.

11. In a wind motor, a series of separate and independent travelling power units, a power cable running between the several units and forming a connection therebetween, said units each including a propelling sail, and a sail controlling wind wheel both travelling with the respective units, and means on each unit acted upon by said controlling wind wheel and acting upon the sail appurtenant to the unit to conform the sail to shifts of the wind.

12. In a wind motor, a power unit adapted to travel and comprising a propelling sail, a controlling wind wheel, a vertical shaft mounting said sail, a sleeve on said shaft, means on the sleeve mounting the shaft to the wind wheel so that the wind wheel will be constrained to turn bodily in unison with the sleeve, a gear train between said shaft and said sleeve, and a drive connection between the shaft of the wind wheel and the shaft of the sail.

13. In a wind motor of the class described, a series of sails, individual means separately mounting said sails and adapted to travel in an endless path, a controlling wind wheel assemblage mounted to travel with each sail and comprising each a pair of wind wheels at an angle to each other, and means acted upon by each wind wheel of each unit and connected with the sail of the unit to cause feathering of the sail in travelling about said path.

14. In a wind motor of the class described, a series of sails, individual means separately mounting said sails and adapted to travel in an endless path, a controlling wind wheel assemblage mounted to travel with each sail and comprising each a pair of wind wheels at an angle to each other, and means acted upon by each wind wheel of each unit and connected with the sail of the unit to cause feathering of the sail in travelling about said path; together with a vane comprised in said assemblage and disposed in a plane medial to the planes of the wind wheels.

15. In a wind motor of the class described, a series of sails, individual means separately mounting said sails and adapted to travel in an endless path, a controlling wind wheel assemblage mounted to travel with each sail and comprising each a pair of wind wheels at an angle to each other, and means acted upon by each wind wheel of each unit and connected with the sail of the unit to cause feathering of the sail in travelling about said path, said last-mentioned means comprising a shaft on which the sail is mounted, a sleeve about said shaft, a gear train between said sleeve and said shaft, shafts mounting the separate wind wheels of the controlling assemblage, a shaft driven by the turning of either or both of said wind wheels, and a gear connection between said last-mentioned shaft and the sail shaft.

WILLIAM R. TWIFORD.